United States Patent [19]

Springer et al.

[11] Patent Number: 5,344,075
[45] Date of Patent: Sep. 6, 1994

[54] LIQUID DISPENSER WITH RELEASE ACTUABLE TRIGGER SWITCH

[75] Inventors: Marlin G. Springer, Danbury; Joseph M. Magrath, McCook; Kenneth D. Wilson, Culbertson, all of Nebr.

[73] Assignee: The Magrath Company, McCook, Nebr.

[21] Appl. No.: 68,440

[22] Filed: May 27, 1993

[51] Int. Cl.$^5$ .............................................. B05B 12/00
[52] U.S. Cl. ..................................... 239/70; 239/526
[58] Field of Search ................................ 239/67-70, 239/526, 525; 222/639, 641, 644

[56] References Cited

U.S. PATENT DOCUMENTS

| | | | |
|---|---|---|---|
| 3,768,732 | 10/1973 | Curtis et al. | 239/70 |
| 3,891,149 | 6/1975 | Rendemonti | 239/70 |
| 4,176,793 | 12/1979 | Heinrich | 239/526 |
| 4,850,536 | 7/1989 | Teranishi et al. | 239/526 |
| 5,074,438 | 12/1991 | Ingram | 239/526 |
| 5,207,381 | 5/1993 | Gill | 239/67 |

Primary Examiner—Karen B. Merritt
Attorney, Agent, or Firm—Holland & Hart

[57] ABSTRACT

A liquid dispenser includes an electric motor-driven pump for pumping liquid from a container through a wand and nozzle. The pump is controlled by a programmable timer which in turn, is actuated by a release actuable trigger switch mounted on the pistol grip secured to the wand.

4 Claims, 2 Drawing Sheets

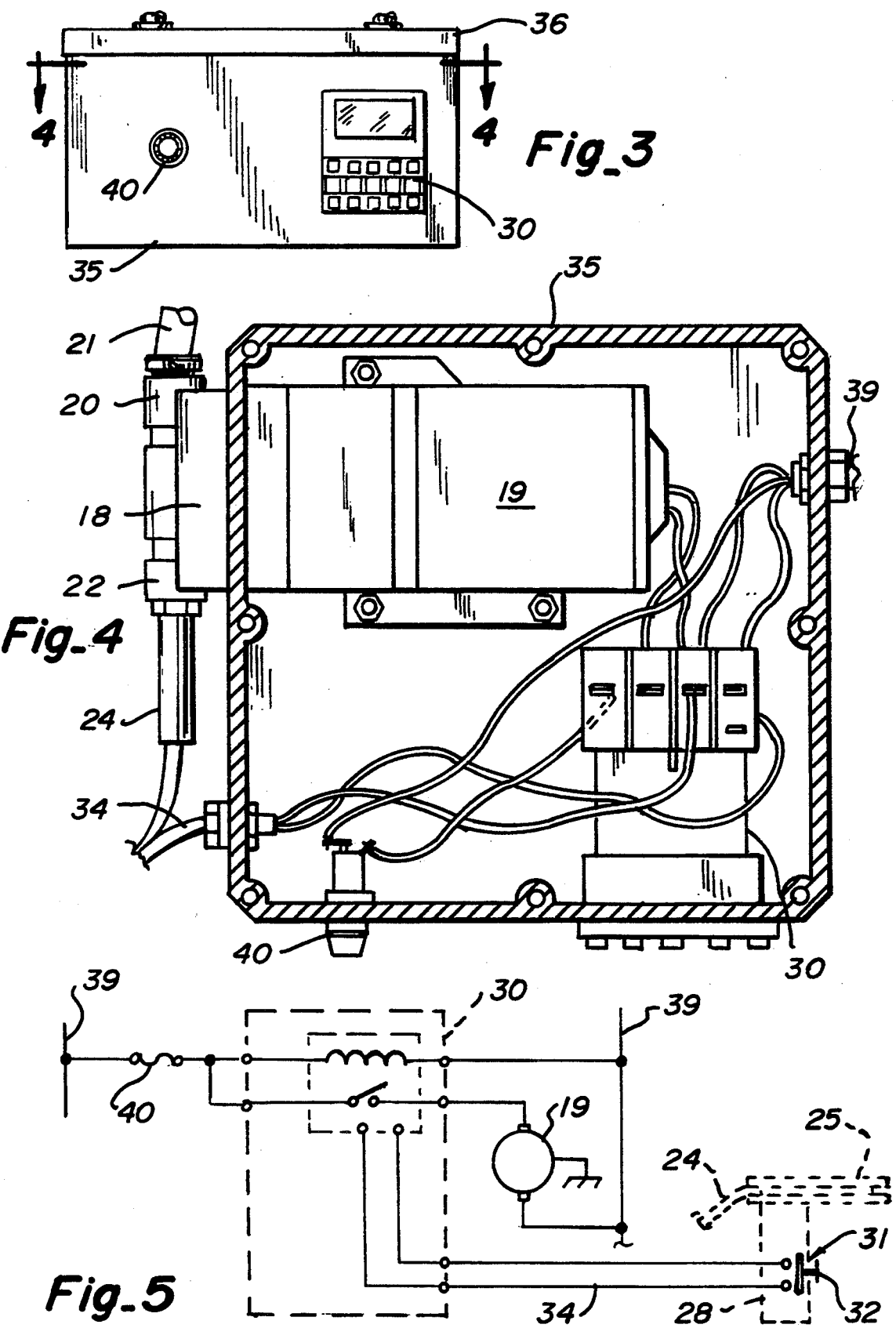

LIQUID DISPENSER WITH RELEASE ACTUABLE TRIGGER SWITCH

BACKGROUND OF THE INVENTION

Field of the Invention

The present invention relates to a dispenser apparatus for dispensing liquids from a container or other source thereof through a hand-held nozzle.

SUMMARY OF THE INVENTION

The present invention is embodied in a dispenser assembly for dispensing liquids from a source thereof such as a container or other reservoir supply. The dispenser assembly includes a pump having an inlet and an outlet. The pump is controllably driven by an electric motor which in turn is actuated by a programmable timer. An inlet conduit is connected between the pump inlet and the liquid container. An outlet conduit extends from the pump outlet to a dispensing nozzle assembly including a wand and an outlet nozzle. A pistol grip handle is secured on said wand and supports a trigger switch which is connected to the timer switch. The trigger switch is of the release actuable type by means of which pressure on the trigger and subsequent release serves to actuate the timer. The timer is programmable to provide alternatively a measured amount of flow for each actuation of the trigger, a continuing repeat of measured amounts of flow, a continuous flow or combinations thereof. The pump is of the bypass type and is self-priming.

DESCRIPTION OF THE DRAWINGS

FIG. 3 is a front elevation view of a housing for the dispenser embodying the present invention.

FIG. 4 is a section view taken substantially in the plane of line 4—4 on FIG. 3.

FIG. 5 is an electrical diagram of the control circuit utilized in the dispenser embodying the present invention.

DESCRIPTION OF THE PREFERRED EMBODIMENT

Figure 1:
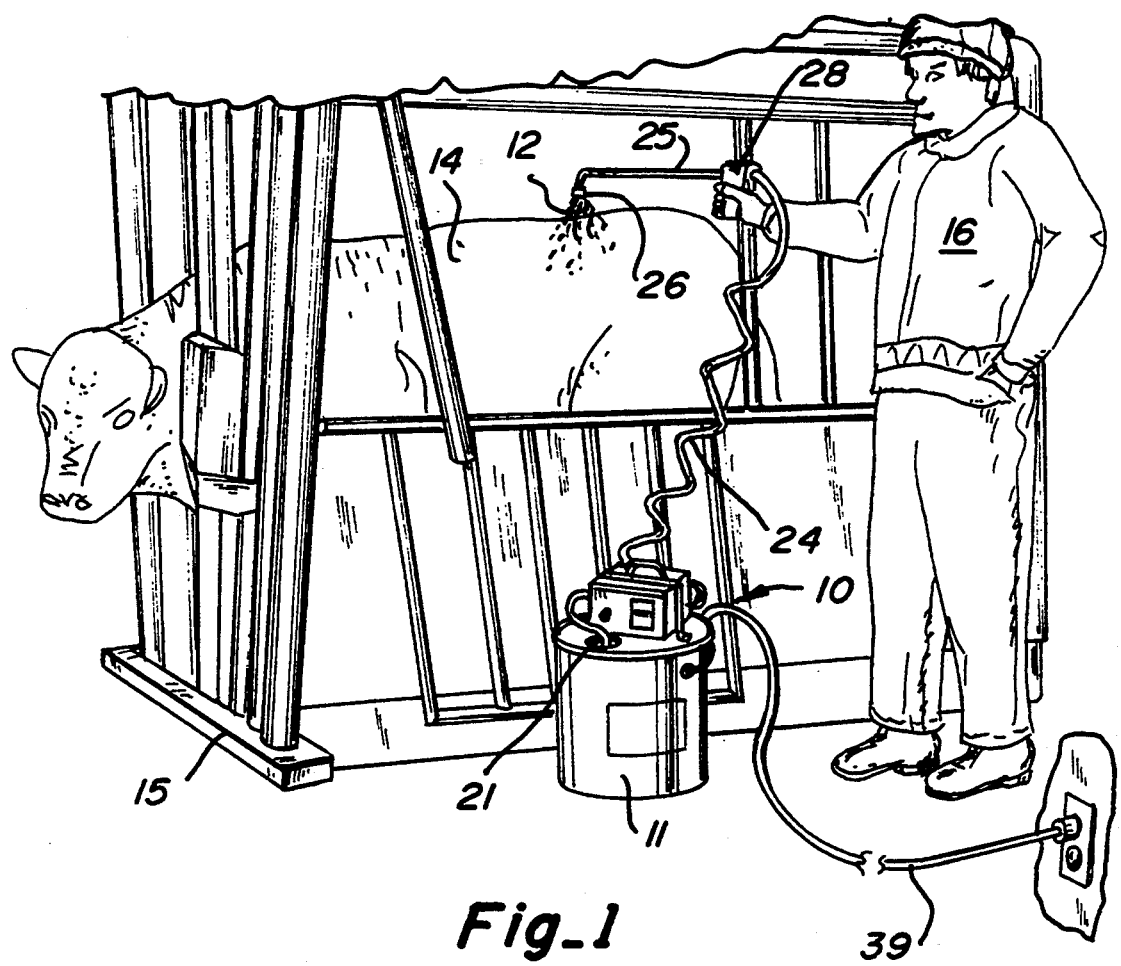
FIG. 1 is a pictorial isometric view of the apparatus embodying the present invention utilized for applying a treatment liquid to an animal.

The present invention is embodied in a dispenser assembly 10 for dispensing a liquid from a container 11 or other source thereof to an application point. For example, the dispenser assembly may be utilized for dispensing liquids 12 to the back of cattle 14 for the purpose of killing or preventing lice, grubs, scabies, and flies. The animal 14 is conventionally retained in a chute 15 but is still capable of moving so that it is important to be able to apply the liquid to the animal without simultaneously drenching the operator 16.

While the dispenser assembly 10 has been shown in its preferred and best mode in a veterinary use, a similar assembly may be used for a wide variety of purposes involving the measurement of liquids of any sort, in quantities from less than 5 ccs to unlimited gallons. For example, the dispenser assembly may be used in agricultural, commercial or domestic purposes, even for purposes such as dispensing correct amounts of liquids into containers for packaging, mixing drinks and beverages, and like applications.

The dispensing assembly 10 embodies a pump 18, preferably of the bypass self-priming type, driven by an electric motor 19. The pump includes an internal bypass (not shown) which allows the pump to bypass internally when discharge is restricted or closed and which stops the bypassing when the discharge valve is opened. Pumps of this type can continue to operate even when the liquid supply to the pump is depleted. One illustrative pump is the Model 2100 Industrial Series Bypass Pump sold under the trademark "FLOWJET" by Flowjet Corporation of Irvine, Calif.

Figure 2:
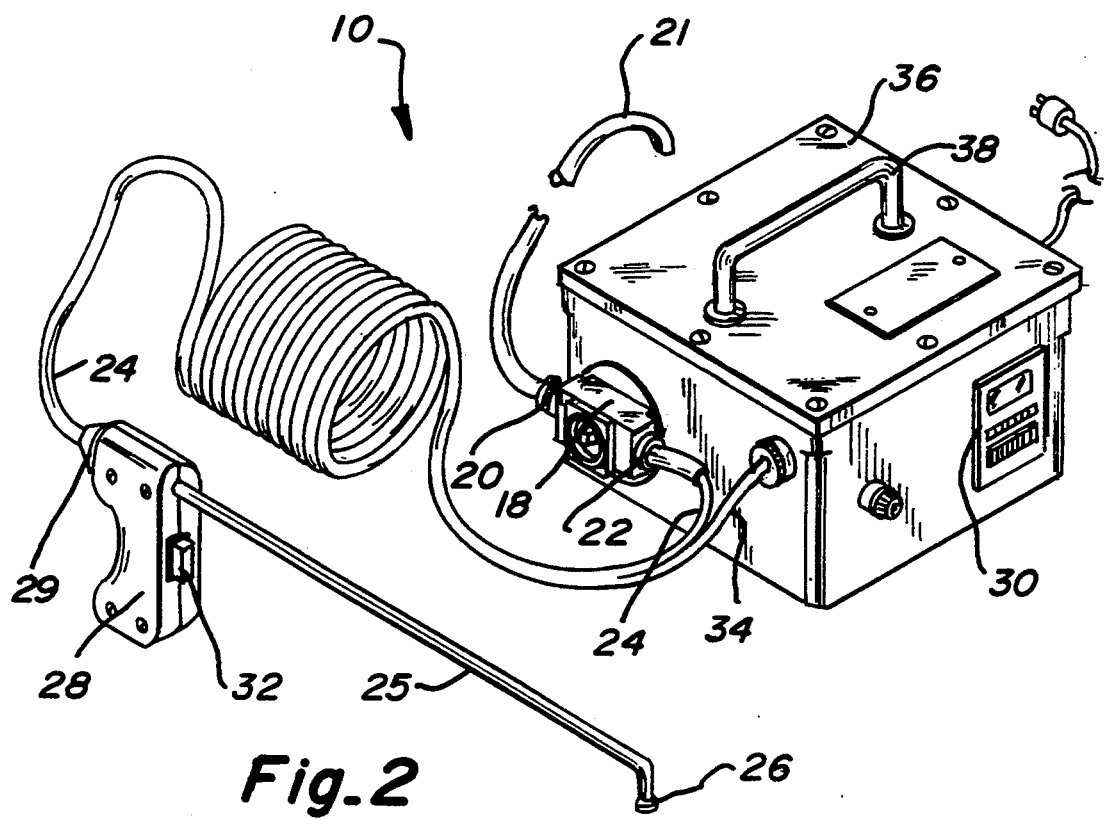
FIG. 2 is a perspective view of the dispenser embodying the present invention.

For pumping liquid from the container 11 (FIGS. 1 and 2), the pump includes a liquid inlet 20 to which is secured an inlet conduit 21 extending from the pump inlet into the liquid container 11. The pumped liquid flows from an outlet 22 from the pump connected to a discharge conduit 24 which in turn is connected to an elongated dispensing wand 25 terminating in a dispensing nozzle 26 for applying the liquid to an object. To enable the operator 16 to hold and position the wand 25 and nozzle 26 in the desired operative location, a pistol grip-type handle 28 is secured to the wand adjacent its connection 29 to the outlet conduit 24.

The operation of the pump is controlled by a timer 30 which is actuated by a trigger switch 31 operated by a trigger button 32 and mounted in the pistol grip handle 28 on the wand 25. The trigger switch 31 is preferably of the release actuable type wherein the trigger switch 31 is actuated upon depressing and subsequently releasing the trigger button 32. The trigger switch 31 is connected to the timer 30 by electrical wires 34 which extend along and are secured to the liquid discharge conduit 24. The release actuable trigger switch 31 provides precise control of the start of the pump 18 Release of the trigger switch 31 starts the timer 30 which in turn actuates the pump 18 to dispense the liquid. The timer 30 runs the pump 18 through a preselected flow cycle, turning the pump 18 off at the completion of the cycle. The operator of the dispensing assembly does not need to continuously hold the switch as in a direct actuable switch, and prevents accidental closing. By making the conduit 24 and control wire 34 of a sufficient length, the operator may utilize the spray wand 25 at a point remote from the pump and liquid container. The pump 18, motor 19 and timer 30 are contained in a housing 35 which is conveniently mounted or positioned on the cover of a liquid container 11. The housing 35 includes a cover plate 36 and carrying handle 38 so that the assembly may be readily transported from one point to another.

The timer 30 is of any suitable commercial type providing a variety of operational modes, including on/off modes, timed modes, and repeat modes. One illustrative timer finding utility in connection with the present invention is the Omron Solid State Timer, Model H3CA, manufactured by Omron Corporation.

The unit may be either energized by connection to an existing electric line 39 through a fuse 40 or may be battery operated.

In operation, the desired treatment liquid is placed in the container 11 and the dispenser assembly 10 mounted on top of the container with the intake conduit 21 immersed in the liquid. The operator 16 locates the wand over the animal or object to be treated, depresses and releases the trigger button 32 whereupon a preselected amount of liquid is applied through the wand 25 and nozzle 12 to the application object, such as a cow 14. The operator presets the timer 30 to provide either continuous flow, timed and measured flow, or repeat flow. The operation may be repeated as determined by the user.

While an illustrative embodiment of the present invention has been shown in the drawings and described above in considerable detail, it should be understood that there is no intention to limit the invention to the specific form disclosed. On the contrary, the intention is to cover all modifications, alternative constructions, equivalents, and uses falling within the spirit and scope of the invention as expressed in the appended claims.

We claim:

1. A dispenser assembly for dispensing liquids from a source thereof, comprising in combination, a pump having an inlet and an outlet, an electric motor for controllably driving said pump, an inlet suction conduit connecting the inlet of said pump to said source of liquid, a dispensing nozzle assembly including a wand and an outlet nozzle on one end of said wand, a pistol grip handle on said wand, an outlet discharge pressure conduit connecting the outlet of said pump to said wand, an electrical timer switch control for actuating said motor to drive said pump in a predetermined cycle, and a release actuable trigger switch on said pistol grip handle for actuating said switch control, said switch control controllably actuating said electric motor to drive said pump for pumping a measured amount of said liquid from said source through said outlet nozzle.

2. The dispenser of claim 1 further comprising:
   a housing having a cover plate and containing said pump, said motor, and said timer; and
   a handle attached to said housing cover plate for transporting said dispenser from one point to another.

3. The dispenser of claim 1 wherein said electrical timer switch control is programmable.

4. The dispenser of claim 3 wherein said programmable electrical timer switch control is set to a preselected flow cycle including one of continuous flow, time and measured flow, and repeat flow.

* * * * *